United States Patent
Khare et al.

(10) Patent No.: US 12,155,748 B2
(45) Date of Patent: Nov. 26, 2024

(54) SYSTEM AND METHOD FOR GENERATING A BLOCK IN A BLOCKCHAIN NETWORK USING A VOICE-BASED HASH VALUE GENERATED BY A VOICE SIGNATURE

(71) Applicant: Bank of America Corporation, Charlotte, NC (US)

(72) Inventors: Prashant Khare, Mumbai (IN); Abhishek Trivedi, Hyderabad (IN); Gaurav Dadhich, Gurgaon (IN); Saurabh Dutta, Delhi (IN); Shruti Nandini Thakur, Hyderabad (IN); Parneet Kaur Gujral, Gurugram (IN); Zeno Valerian Anthony, Hyderabad (IN)

(73) Assignee: Bank of America Corporation, Charlotte, NC (US)

(*) Notice: Subject to any disclaimer, the term of this patent is extended or adjusted under 35 U.S.C. 154(b) by 253 days.

(21) Appl. No.: 17/715,751

(22) Filed: Apr. 7, 2022

(65) Prior Publication Data
US 2023/0327853 A1 Oct. 12, 2023

(51) Int. Cl.
*H04L 9/06* (2006.01)
*H04L 9/00* (2022.01)

(52) U.S. Cl.
CPC .............. *H04L 9/0643* (2013.01); *H04L 9/50* (2022.05)

(58) Field of Classification Search
None
See application file for complete search history.

(56) References Cited

U.S. PATENT DOCUMENTS

| 7,191,433 B2 | 3/2007 | Narad et al. |
| 8,041,644 B2 | 10/2011 | Ogg et al. |
| 8,271,132 B2 | 9/2012 | Nielsen et al. |

(Continued)

FOREIGN PATENT DOCUMENTS

| CA | 2954559 A1 | 7/2011 |
| CN | 105786797 B | 9/2018 |
| KR | 20200129799 A | 11/2020 |

OTHER PUBLICATIONS

Lin Liu et al., "Voice Source Tracking Technology Based on Perceptual Hash of Fingerprint Image", downloaded from the Internet, URL: https://ieeexplore.ieee.org/document/9660452, pp. 349-353 (Year: 2021).*

(Continued)

*Primary Examiner* — Trang T Doan

(57) ABSTRACT

A system receives a speech of a user that indicates a request. The system extracts a plurality of voice features from the speech. The system converts the speech into a plurality of binary digits. The system determines a first voice feature constant value associated with a first voice feature, where the first voice feature constant value is an average of the first voice feature. The system determines a second voice feature constant value associated with the second voice feature, where the second voice feature constant value is an average of the second voice feature. The system encrypts the plurality of binary digits using the first and second voice feature constant values, where the encrypted plurality of binary digits corresponds to a voice-based hash value. The system generates a new block in a blockchain network using the voice-based hash value.

17 Claims, 5 Drawing Sheets

(56) References Cited

U.S. PATENT DOCUMENTS

| | | |
|---|---|---|
| 8,316,237 B1 | 11/2012 | Felsher et al. |
| 8,769,304 B2 | 7/2014 | Kirsch |
| 9,509,690 B2 | 11/2016 | Carter et al. |
| 9,849,364 B2 | 12/2017 | Tran et al. |
| 10,022,613 B2 | 7/2018 | Tran et al. |
| 10,022,614 B1 | 7/2018 | Tran et al. |
| 10,200,834 B2 | 2/2019 | Tran et al. |
| 10,715,317 B2 | 7/2020 | Chari et al. |
| 10,761,877 B2 | 9/2020 | Peffers et al. |
| 10,839,020 B2 | 11/2020 | Shah |
| 10,878,522 B2 | 12/2020 | Blackman et al. |
| 10,997,251 B2 | 5/2021 | Tran et al. |
| 11,127,405 B1* | 9/2021 | Antos .................... G10L 15/30 |
| 11,130,042 B2 | 9/2021 | Tran |
| 11,188,977 B2 | 11/2021 | Youb et al. |
| 11,664,029 B2* | 5/2023 | Engelke .............. H04M 1/2475 |
| | | 704/251 |
| 11,755,668 B1* | 9/2023 | Stewart ................... G06N 3/09 |
| | | 707/709 |
| 11,762,052 B1* | 9/2023 | Ganguly ................. G01S 5/20 |
| | | 367/124 |
| 11,816,932 B1* | 11/2023 | Tang .................... G06V 10/761 |
| 11,856,674 B1* | 12/2023 | Sanchez .............. G06F 3/04845 |
| 11,869,535 B1* | 1/2024 | Bahadori ................ G10L 25/63 |
| 12,022,016 B2 | 6/2024 | Khare et al. |
| 2003/0023444 A1* | 1/2003 | St. John ................ H04M 3/493 |
| | | 704/E15.044 |
| 2009/0191521 A1* | 7/2009 | Paul ........................ G10L 15/02 |
| | | 600/300 |
| 2012/0123232 A1* | 5/2012 | Najarian ................. G16Z 99/00 |
| | | 600/407 |
| 2012/0239647 A1* | 9/2012 | Savenok .............. G06F 16/683 |
| | | 707/E17.014 |
| 2013/0266925 A1* | 10/2013 | Nunamaker, Jr. ......... G09B 7/00 |
| | | 434/362 |
| 2014/0089243 A1* | 3/2014 | Oppenheimer ......... H04L 67/12 |
| | | 706/46 |
| 2014/0278389 A1* | 9/2014 | Zurek .................... G10L 15/20 |
| | | 704/231 |
| 2014/0286644 A1* | 9/2014 | Oshima .................. H04B 10/11 |
| | | 398/118 |
| 2015/0278820 A1 | 10/2015 | Meadows |
| 2016/0112204 A1* | 4/2016 | Cipli .................... H04L 9/3247 |
| | | 713/176 |
| 2016/0224768 A1 | 8/2016 | Boccon-Gibod et al. |
| 2017/0148021 A1 | 5/2017 | Goldstein et al. |
| 2017/0163645 A1 | 6/2017 | Bradley et al. |
| 2017/0228822 A1 | 8/2017 | Creighton, IV et al. |
| 2017/0236120 A1 | 8/2017 | Herlihy et al. |
| 2017/0352027 A1 | 12/2017 | Zhang et al. |
| 2018/0025442 A1 | 1/2018 | Isaacson et al. |
| 2018/0041345 A1 | 2/2018 | Maim |
| 2018/0189783 A1 | 7/2018 | Flurscheim et al. |
| 2018/0247302 A1 | 8/2018 | Armstrong et al. |
| 2018/0268386 A1 | 9/2018 | Wack et al. |
| 2018/0268401 A1 | 9/2018 | Ortiz et al. |
| 2018/0285217 A1 | 10/2018 | Smith et al. |
| 2018/0302417 A1 | 10/2018 | Wilson |
| 2019/0005469 A1 | 1/2019 | Dhupkar et al. |
| 2019/0013932 A1 | 1/2019 | Maino et al. |
| 2019/0081793 A1 | 3/2019 | Martino et al. |
| 2019/0082007 A1 | 3/2019 | Klarman et al. |
| 2019/0087893 A1 | 3/2019 | Pellew |
| 2019/0130114 A1 | 5/2019 | Smith et al. |
| 2019/0158482 A1 | 5/2019 | Wang |
| 2019/0297243 A1* | 9/2019 | Oshima .................. H04N 23/73 |
| 2019/0303887 A1 | 10/2019 | Wright et al. |
| 2019/0354518 A1 | 11/2019 | Zochowski |
| 2019/0356609 A1 | 11/2019 | Grunwald et al. |
| 2019/0358515 A1 | 11/2019 | Tran et al. |
| 2019/0361917 A1 | 11/2019 | Tran et al. |
| 2020/0027096 A1 | 1/2020 | Cooner |
| 2020/0351095 A1* | 11/2020 | Yadav .................... H04L 9/3239 |
| 2021/0035092 A1 | 2/2021 | Pierce |
| 2021/0049305 A1 | 2/2021 | Wilson |
| 2021/0090037 A1 | 3/2021 | Dowding |
| 2021/0360313 A1* | 11/2021 | Dean .................... G11B 27/031 |
| 2022/0023742 A1 | 1/2022 | Tran et al. |
| 2022/0198039 A1* | 6/2022 | Chen .................. H03M 13/1515 |
| 2022/0233119 A1* | 7/2022 | Shelton, IV ...... A61B 17/07207 |
| 2022/0305202 A1* | 9/2022 | Rosinko ............. G06Q 30/0633 |
| 2022/0351425 A1* | 11/2022 | Etwaru ............. H04Q 1/72484 |
| 2023/0008214 A1* | 1/2023 | Northen ................ A61M 21/00 |
| 2023/0075118 A1* | 3/2023 | Yano ..................... G01K 11/32 |
| 2023/0186941 A1* | 6/2023 | Juneja ................... G10L 15/22 |
| | | 704/239 |
| 2023/0300532 A1* | 9/2023 | Spittle .................... G06F 3/165 |
| | | 381/1 |
| 2023/0409633 A1* | 12/2023 | Lebecque ............ G06F 16/635 |

OTHER PUBLICATIONS

Lin Liu et al., "Voice Source Tracking Technology Based on Perceptual Hash of Fingerprint Image", downloaded from the Internet, URL: https://ieeexplore.ieee.org/document/9660452, pp. 349-353 (Year: 2021) (Year: 2021).*

* cited by examiner

SYSTEM AND METHOD FOR GENERATING A BLOCK IN A BLOCKCHAIN NETWORK USING A VOICE-BASED HASH VALUE GENERATED BY A VOICE SIGNATURE

TECHNICAL FIELD

The present disclosure relates generally to cryptography and security, and more specifically to a system and method for generating a block in a blockchain network using a voice-based hash value generated by a voice signature.

BACKGROUND

Clients of an organization request services from the organization, such as opening an account. In some cases, a client may provide incomplete and/or incorrect information in the request. In such cases, additional information may be manually sought from the client. This process is labor-intensive and prone to human error. It is challenging to evaluate each user request to determine whether it includes incomplete and/or incorrect information.

SUMMARY

The system described in the present disclosure is particularly integrated into a practical application of improving the technology of generating a new block in a blockchain network by generating a voice-based hash value for the new block based on unique voice signatures associated with a user. The disclosed system is further integrated into an additional practical application of improving the exception or anomaly handling technology in evaluating a user request. These practical applications provide several technical advantages, including improving information security technology. These practical applications are described below.
Generating a Voice-Based Hash Value for a Block in a Blockchain The present disclosure contemplates systems and methods configured to generate a block in a blockchain network using a voice-based hash value generated by a voice signature of a user. In an example scenario, assume that the user initiates a request to an organization. The request may be opening an account with the organization. The user may indicate the request in a speech, such as over the phone. The disclosed system extracts voice features from the speech of the user, and uses the voice features to generate a voice-based hash value of a new block in a blockchain network. The voice-based hash value may be used to uniquely identify the block, the user, and/or the request. The voice-based hash value provides more security and reliability compared to an arbitrary hash value used to generate the block because the voice-based hash value may be used to identify the identity of the user based on unique voice signatures of the user as well as the block. However, an arbitrary hash value cannot be used to identify the identity of the user. Thus, the voice-based hash value provides a unique link between the identity of the user and the block. Accordingly, the disclosed system is integrated into a practical application of improving the technology of generating a new block in a blockchain network by generating a voice-based hash value for the new block based on unique voice signatures associated with a user.

In one embodiment, a system for generating a block in a blockchain network using a voice-based hash value comprises a network interface and a processor. The network interface is configured to receive a speech signal associated with a user that indicates a request. The processor is operably coupled with the network interface. The processor accesses the speech signal. The processor extracts a plurality of voice features from the speech. The plurality of voice features represents a unique voice signature associated with the use. The plurality of voice features comprises a first voice feature and a second voice feature. The first voice feature comprises a first range of values associated with the speech signal. The second voice feature comprises a second range of values associated with the speech signal. The processor converts the speech signal into a plurality of binary digits. The processor determines a first voice feature constant value associated with the first voice feature, where the first voice feature constant value comprises an average of the first range of values. The processor determines a second voice feature constant value associated with the second voice feature, wherein the second voice feature constant value comprises an average of the second range of values. The processor encrypts the plurality of binary digits using at least the first voice feature constant value and the second voice feature constant value, wherein the encrypted plurality of binary digits corresponds to a voice-based hash value. The processor generates a new block in a blockchain network using the voice-based hash value, wherein the voice-based hash value uniquely identifies the new block.
Identifying and Resolving Exceptions in User Requests The present disclosure further contemplates systems and methods configured to identify and resolve exception request blocks in a blockchain network. In an example scenario, assume that the user initiates a request to an organization, similar to that described above. The request may be opening an account with the organization.

One potential approach is that the user fills out an application form online or in person, and hands over the filled out application form to the organization. In some cases, there may be one or more exceptions in the request. For example, the exceptions may include incomplete information that the user provided, e.g., incomplete address, incomplete name, etc. In another example, the exception may include incorrect information that the user provided, e.g., incorrect address, etc. In another example, the exception may include irregular requests that cannot be processed automatically, e.g., when the user requests to only include a first name on the new account without a last name. The exceptions may include any anomaly that cannot be processed automatically and be granted/denied.

In such cases, an employee of the organization has to manually investigate the request and the exception. In some cases, the employee may need to contact the user to request additional information, confirm the provided information, and/or correct the provided information. However, this process is labor-intensive and prone to human error. For example, multiple follow-ups with the user may be performed for obtaining missing information, and manually validate all the provided information to mitigate any potential fraudulent activity. For example, in case, the user is a bad actor and intentionally provided incorrect and/or incomplete information, if such anomaly is left undetected, a bad actor may be granted an account at the organization which the bad actor may use for fraudulent activity. In another example, there are several security-related guidelines by which the accounts are granted to users. If such anomaly is left undetected, the employee may indivertibly breach the guidelines. Therefore, the disclosed system improves information security technology.

Thus, the present disclosure provides technical solutions to these technical problems and contemplates a system and method configured to determine the identity of the user (using the voice of the user), use the speech of the user to generate a voice-based hash value of a block (in a blockchain network) to store the user request, and determine whether the exceptions can be resolved and if so, resolve the exceptions.

The exceptions may have various types. The disclosed system may determine the type of each exception, and classify each exception based on its type. The disclosed system may implement various pre-trained multitask machine learning programs to determine the type of each exception and classify each exception. The disclosed system may determine whether the exception can be resolved by comparing the provided information in the user request with previous records associated with the user. The disclosed system may determine a similarity score between the provided information and previous records associated with the user.

If it is determined that the similarity score is more than a threshold value (e.g., 99%), the disclosed system determines that the exception can be resolved. The disclosed system may resolve the exception by replacing the exception with the previously verified information fetched from previous user records. In this case, the disclosed system grants the request and generates a new block for the request in the blockchain network. Otherwise, the disclosed system determines that the exception cannot be resolved and denies the request.

Accordingly, the disclosed system is integrated into an additional practical application of improving the exception or anomaly handling technology in evaluating a user request. Since the exceptions are handled by the disclosed system, the disclosed system obviates the need for manually retrieving the missing and/or incorrect user information from the user, multiple follow-up calls. Furthermore, the disclosed system reduces potential human errors in retrieving the required information. Furthermore, the disclosed system improves the security of computer systems and databases tasked to store and maintain user records at the organization by verifying the identity of a user who initiated a request and denying requests of bad actors to open an account at the organization which the bad actor may use for fraudulent activity, e.g., gain unauthorized access to the computer systems and databases and modify and/or delete user data stored at the computer systems and databases.

In one embodiment, a system for resolving anomalies in requests comprises a memory and a processor. The memory is configured to store a speech signal that comprises a request associated with a user. The processor is operably coupled to the memory. The processor determines that the request comprises an anomaly, where the anomaly impedes processing of the request to be granted or denied. The processor determines a type of the anomaly, where the type of the anomaly indicates whether the anomaly is incomplete information, incorrect information, or previously-unknown information comprised in the request. The processor generates a block in a blockchain network, where the block is configured to store anomalies with a same type. The processor stores the anomaly in the block. The processor compares the request with user information previously provided by the user, where the user information comprises at least one of a name, an address, and contact information associated with the user. The processor determines a similarity score between the request and the user information, where the similarity score indicates a percentage of similarity between the request and the user information. The processor compares the similarity score with a threshold percentage. In response to determining that the similarity score exceeds the threshold percentage, the processor determines that the anomaly can be resolved. The processor resolves the anomaly.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide efficient and reliable solutions to provide a secure and reliable process for generating a block in a blockchain or handling exceptions or anomalies in user requests. Embodiments of the present disclosure and its advantages may be understood by referring to FIGS. 1 through 5. FIGS. 1 through 5 are used to describe a system and method for generating a block in a blockchain network using a voice-based hash value generated by a voice signature of a user, and identifying and resolving exception request blocks in a blockchain network.

System Overview

Figure 1:
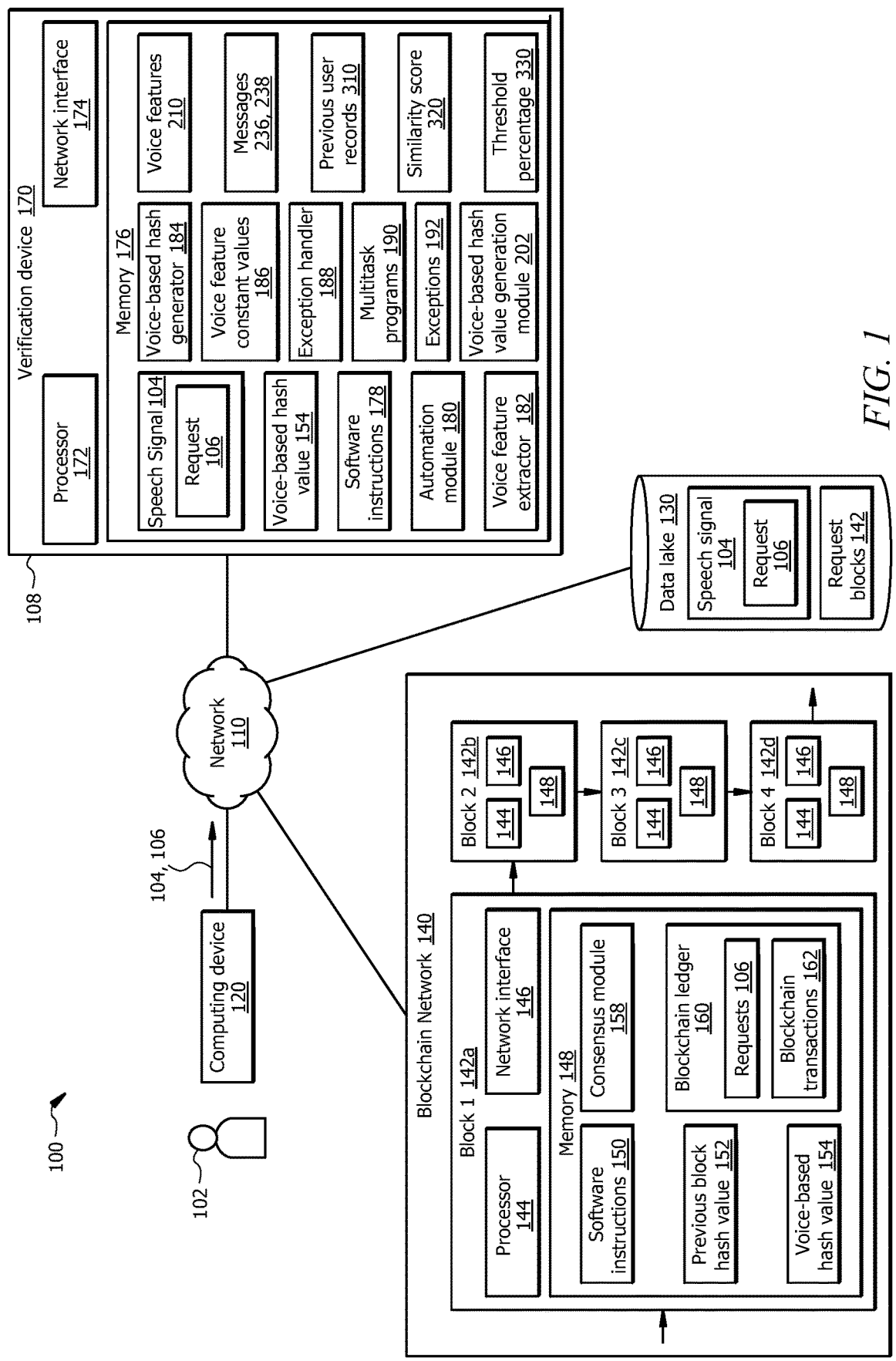
FIG. 1 illustrates an embodiment of a system configured to generate a block in a blockchain network using a voice-based hash value generated by a voice signature of a user, and identify and resolve exception request blocks in a blockchain network.

FIG. 1 illustrates an embodiment of a system 100 that is generally configured to generate a block 142 in a blockchain network 140 using a voice-based hash value 154 generated by voice features, and identify exceptions 192 in request blocks 142 of the blockchain network 140. In one embodiment, system 100 comprises a verification device 170 communicatively coupled with a computing device 120, a data lake 130, and the blockchain network 140 via a network 110. Network 110 enables communications between the components of the system 100. Data lake 130 stores information that can be used by the verification device 170. The blockchain network 140 includes a plurality of blocks 142 (such as blocks 142*a-d*). Each block 142 may store a record in a distributed ledger 160 that is distributed among the blocks 142. The verification device 170 comprises a processor 172 in signal communication with a memory 176. Memory 176 stores software instructions 178 that when executed by the processor 172, cause the processor 172 to perform one or more operations of the verification device 170 described herein. For example, when the processor executes the software instructions 178, the processor 172 executes the automation module 180 that is configured to process an incoming request 106. In another example, when the processor executes the software instructions 178, the processor 172 executes a voice feature extractor 182 and a voice-based hash generator 184 to use the speech signal 104 to generate a voice-based hash value 154, generate a block 142 in a blockchain using the voice-based hash value 154. In another example, when the processor 172 executes the software instructions 178, the processor 172 executes an exception handler 188 that is configured to identify exceptions 192 (e.g., anomalies) in requests 106 received from a user 102, determine whether the detected exception 192 can be resolved, in response to determining that the exception 192 can be resolved, resolve the exception 192, grant the request 106, store the request 106 in a new block 142. In other embodiments, system 100 may not have all of the components listed and/or may have other elements instead of, or in addition to, those listed above.

In an example scenario, assume that a user 102 initiates a request 106. For example, the request 106 may include opening an account at an organization 108. One potential approach is that the user 102 fills out an application form online or in person, and hand over the filled out application form to the organization 108. The request 106 is processed by the automation module 180. Typically, the automation module 180 is configured to process the request 106, and open a new account for the user 102 (if the request 106 is to open an account).

In some cases, there may be one or more exceptions 192 in the request 106. For example, the exceptions 192 may include incomplete information that the user 102 provided, e.g., incomplete address, incomplete name, etc. In another example, the exception 192 may include incorrect information that the user 102 provided, e.g., incorrect address, etc. In another example, the exception 192 may include an irregular request that the automation module 180 is not configured or trained to process automatically, such as a request to only include a first name on an account without a last name. The exceptions 192 may include any anomaly that the automation module 180 may not be able to automatically process the request 106, and grant or deny it.

In such cases, an employee of the organization 108 has to manually investigate the request 106 and the exception 192. In some cases, the employee may need to reach the user 102 to request additional information, confirm the provided information, and/or correct the provided information. However, this process is labor-intensive and prone to human-error. For example, multiple follow-ups with the user 102 may be performed for obtaining missing information, and manually validating all the provided information may be needed to mitigate any potential fraudulent activity. For example, in case, the user 102 is a bad actor and intentionally provided incorrect and/or incomplete information, if such anomaly is left undetected, the user 102 may be granted an account at the organization 108 which the user 102 may use for fraudulent activity. In another example, there are several security-related guidelines by which the accounts are granted to users 102. If such an anomaly is left undetected, the employee may inadvertently breach the guidelines. Thus, the present disclosure provides technical solution to these technical problems and contemplates the system 100 that is configured to determine the identity of the user 102 (using the voice of the user 102), use the speech signal 104 associated with the user 102 to process the request 106, and determine whether the exceptions 192 can be resolved, and if so, resolve the exceptions 192. The operations of the system 100 are described in greater detail below in conjunction with FIGS. 2-5.

System Components

Network

Network 110 may be any suitable type of wireless and/or wired network. The network 110 is not connected to the Internet or public network. The network 110 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network that is not connected to the Internet. The network 110 may be configured to support any suitable type of communication protocol as would be appreciated by one of ordinary skill in the art.

Computing Device

Computing device 120 is generally any device that is configured to process data and interact with users 102. Examples of the computing device 120 include, but are not limited to, a personal computer, a desktop computer, a workstation, a server, a laptop, a tablet computer, a mobile phone (such as a smartphone), etc. The computing device 120 may include a user interface, such as a display, a microphone, keypad, or other appropriate terminal equipment usable by user 102. The computing device 120 may include a hardware processor, memory, and/or circuitry (not explicitly shown) configured to perform any of the functions or actions of the computing device 120 described herein. For example, a software application designed using software code may be stored in the memory and executed by the processor to perform the functions of the computing device 120. The computing device 120 is configured to communicate with other devices via the network 110, such as the verification device 170. The user 102 may indicate a request 106 in a speech 104 by a microphone of the computing device 120. The computing device 120 may communicate the speech 104 that includes the request 106 to the verification device 170 for processing. The speech 104 may interchangeably be referred to herein as an input voice, a speech signal, or an input audio.

Data Lake

Data lake 130 generally comprises any storage architecture. Examples of the data lake 130 include, but are not limited to, a network-attached storage cloud, a storage area network, a storage assembly directly (or indirectly) coupled to one or more components of the system 100. The data lake 130 stores a plurality of speeches 104 and request blocks 142. The speeches 104 are the provided input voices 104 from the user 102. When the user 102 provides an input voice 104, the verification device 170 stores the input voice 104 in the data lake 130.

Blockchain Network

Blockchain network 140 comprises a cloud of computer systems (referred to herein as blocks 142) and is generally configured to keep records of requests 106 and any other data, and communications and interactions among the blocks 142. The blockchain network 140 may comprise any number of blocks 142. Each block 142 may comprise a computing device, a virtual machine, and/or the like. In the present disclosure, a block 142 may interchangeably be referred to as a network node, a node, or a network device. The blockchain network 140 generally refers to a distributed database (e.g., distributed ledger 160) shared between a plurality of network nodes 142 in a network. The system 100 may employ any suitable number of devices (e.g., network nodes 142) to form a distributed network that maintains the requests 106 in form of a blockchain. The blockchain links together the blocks 142 of data which may include the requests 106.

Each network node 142 comprises a blockchain ledger 160 (e.g., stored in the memory 148) that is configured to store a copy of the blockchain 140 (not explicitly shown), which contains the requests 106 and every blockchain transaction 162 executed in the network. The blockchain 140 links together blocks 142 of data which comprise identifiable units called blockchain transactions 162. Blockchain transactions 162 may comprise information, files, or any other suitable type of data, such as data associated with digital documents, requests 106, user information, or any other type of information.

Each block 142 in the blockchain 140 comprises a hash value (e.g., a voice-based hash value 154) and information derived from a preceding block 142. For example, every block 142 in the blockchain 140 includes a hash 152 of the previous block 142. By including the hash 152, the blockchain 140 comprises a chain of blocks 142 from a genesis block 142 to the current block 142. Each block 142 is guaranteed to come after the previous block 142 chronologically because the previous block's hash 152 would otherwise not be known. In one embodiment, blocks 142 in a blockchain 140 may be linked together by identifying a preceding block 142 with a cryptographic checksum (e.g., secure hash algorithm (SHA)-256) of its contents (e.g. blockchain transactions 162, data 156, and additional metadata stored in the memory 148) which serves as each block's unique identifier. Links are formed by storing the cryptographic checksum identifier of one block 142 in the metadata of another block 142, such that the former block 142 becomes the predecessor of the latter block 142. In this way, the blocks 142 form a chain that can be navigated from block-to-block by retrieving the cryptographic checksum of a particular block's predecessor from the particular block's own metadata. Each block 142 is computationally impractical to modify once it has been in the blockchain 140 because every block 142 after it would also have to be regenerated. These features protect data stored in the blockchain 140 from being modified by bad actors which provides information security.

The consensus module 158 is configured to establish a consensus among the blocks 142 about the present state of the distributed ledger 160. For example, the consensus module 158 may be executed by the processor 144 executing the software instructions 150 to implement a procedure through which all the blocks 142 of the blockchain network 140 reach a common agreement about the present state of the distributed ledger 160. In this way, consensus module 158 in each block 142 achieves reliability in the blockchain network 140 and establish trust between the blocks 142 in a distributed computing environment. Essentially, the consensus protocol makes sure that every new block 142 that is added to the blockchain 140 is the one and only version of the truth that is agreed upon by all the nodes 142 in the blockchain 140.

When a network node 142 publishes an entry (e.g. a transaction 162, a request 106 in a block 142) in its blockchain ledger 160, the blockchain 140 for all other network nodes 142 in the distributed network is also updated with the new entry. Thus, data published in a blockchain 140 is available and accessible to every network node 142 with a blockchain ledger 160. This allows the data stored in the block 142 to be accessible for inspection and verification at any time by any device with a copy of the blockchain ledger 160.

Each of the network nodes 142a-142d is an instance of a network node 142. Each network node 142 may comprise a processor 144 in signal communication with a memory 148 and a network interface 146.

Processor 144 comprises one or more processors operably coupled to the memory 148. The processor 144 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 144 may be a programmable logic device, a microcontroller, a microprocessor, or any suitable combination of the preceding. The one or more processors are configured to process data and may be implemented in hardware or software. For example, the processor 144 may be 8-bit, 16-bit, 32-bit, 64-bit, or of any other suitable architecture. The processor 144 may include an arithmetic logic unit (ALU) for performing arithmetic and logic operations. The processor 144 may register the supply operands to the ALU and stores the results of ALU operations. The processor 144 may further include a control unit that fetches instructions from memory and executes them by directing the coordinated operations of the ALU, registers and other components. The one or more processors are configured to implement various software instructions. For example, the one or more processors are configured to execute software instructions 150 to perform one or more functions described herein. In this way, processor 144 may be a special-purpose computer designed to implement the functions disclosed herein. In an embodiment, the processor 144 is implemented using logic units, FPGAs, ASICs, DSPs, or any other suitable hardware. The processor 144 is configured to operate as described in FIGS. 1-5.

Network interface 146 is configured to enable wired and/or wireless communications (e.g., via network 110). The network interface 146 is configured to communicate data between the network node 142 and other devices (e.g., computing devices 120), verification device 170, services, other network nodes 142, data lake 130, databases, systems, or domains. For example, the network interface 146 may comprise a WIFI interface, a local area network (LAN) interface, a wide area network (WAN) interface, a modem, a switch, or a router. The processor 144 is configured to send and receive data using the network interface 146. The network interface 146 may be configured to use any suitable type of communication protocol as would be appreciated by one of ordinary skill in the art.

Memory 148 may be volatile or non-volatile and may comprise a read-only memory (ROM), random-access memory (RAM), ternary content-addressable memory (TCAM), dynamic random-access memory (DRAM), and static random-access memory (SRAM). Memory 148 may be implemented using one or more disks, tape drives, solid-state drives, and/or the like. The memory 148 may store any of the information described in FIGS. 1-5 along with any other data, instructions, logic, rules, or code operable to implement the function(s) described herein when executed by processors 144. The memory 148 is operable to store software instructions 150, previous block hash value 152, voice-based hash value 154, data 156, consensus module 158, blockchain ledger 160, and/or any other data and instructions. The data 156 may include timestamps of reception of requests 106, index of the block 142, etc. The voice-based hash value 154 may be interchangeably referred to herein as a hash value 154. The hash value 154 may be used to uniquely identify the corresponding network node 142. For example, the hash value 154 may include an alphanumerical string. The hash 152 of the previous block 142 may include a hash value 152 of the previous block 142 generated before the corresponding block 142. The order and place of the block 142 in the blockchain 140 may be determined by the hash 152 of the previous block 142. The software instructions 150 may comprise any suitable set of software instructions, logic, rules, or code operable to execute the processor 144 to perform the functions of the processor 144 and the block 142 described herein.

Each block 142 may include information derived from a preceding block 142. For example, every block 142 in the blockchain includes a hash 152 of the previous block 142. By including the hash 152 of the previous block 142, the blockchain network 140 includes a chain of blocks 142a to 142d from a genesis block 142a (or a block not shown to the left of the block 142a in the example of FIG. 1) to the latest block 142d (or a block not shown to the right of the block 142d in the example of FIG. 1). Each block 142 is guaranteed to come after the previous block 142 chronologically because the previous block's hash value 152 would otherwise not be known.

Verification Device

Verification device 170 is generally a device that is configured to process data and communicate with computing devices (e.g., computing devices 120), blockchain network 140, databases, data lakes 130, systems, etc., via the network 110. The verification device 170 may be associated with the organization 108. The verification device 170 is generally configured to oversee the operations of the processor 172 as described further below in conjunction with the operational flow 200 of system 100 described in FIG. 2, the operational flow 300 of system 100 described in FIG. 3, and method 400 described in FIG. 4, and method 500 described in FIG. 5.

Processor 172 comprises one or more processors operably coupled to the memory 176. The processor 172 is any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). For example, one or more processors may be implemented in cloud devices, servers, virtual machines, and the like. The processor 172 may be a programmable logic device, a microcontroller, a microprocessor, or any suitable combination of the preceding. The one or more processors are configured to process data and may be implemented in hardware or software. For example, the processor 172 may be 8-bit, 16-bit, 32-bit, 64-bit, or of any other suitable architecture. The processor 172 may include an arithmetic logic unit (ALU) for performing arithmetic and logic operations, registers the supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 178) to implement the processor 172. In this way, processor 172 may be a special-purpose computer designed to implement the functions disclosed herein. In an embodiment, the processor 172 is implemented using logic units, FPGAs, ASICs, DSPs, or any other suitable hardware. The processor 172 is configured to operate as described in FIGS. 1-5. For example, the processor 172 may be configured to perform one or more operations of method 400 as described in FIG. 4 and one or more operations of method 500 as described in FIG. 5.

Network interface 174 is configured to enable wired and/or wireless communications. The network interface 174 may be configured to communicate data between the verification device 170 and other devices, systems, or domains. For example, the network interface 174 may comprise an NFC interface, a Bluetooth interface, a Zigbee interface, a Z-wave interface, a radio-frequency identification (RFID) interface, a WIFI interface, a LAN interface, a WAN interface, a MAN interface, a PAN interface, a WPAN interface, a modem, a switch, and/or a router. The processor 172 may be configured to send and receive data using the network interface 174. The network interface 174 may be configured to use any suitable type of communication protocol.

The memory 176 may be volatile or non-volatile and may comprise read-only memory (ROM), random-access memory (RAM), ternary content-addressable memory (TCAM), dynamic random-access memory (DRAM), and static random-access memory (SRAM). The memory 176 may include one or more of a local database, cloud database, network-attached storage (NAS), etc. The memory 176 comprises one or more disks, tape drives, or solid-state drives, and may be used as an over-flow data storage device, to store programs when such programs are selected for execution, and to store instructions and data that are read during program execution. The memory 176 may store any of the information described in FIGS. 1-5 along with any other data, instructions, logic, rules, or code operable to implement the function(s) described herein when executed by processor 172. For example, the memory 176 may store software instructions 178, automation module 180, speech signal 104, voice-based hash values 154, voice feature extractor 182, voice-based hash generator 184, voice feature constant values 186, exception handler 188, multitask programs 190, exceptions 192, previous user records 310, similarity score 320, voice-based hash generation module 202, threshold percentage 330, messages 236, 238, and/or any other data or instructions. The software instructions 178 may comprise any suitable set of instructions, logic, rules, or code operable to execute the processor 172 and perform the functions described herein, such as some or all of those described in FIGS. 1-5.

Voice Feature Extractor

Voice feature extractor 182 may be implemented by the processor 172 executing the software instructions 178, and is generally configured to extract voice features 210 from the input voice 104. In certain embodiments, the voice feature extractor 182 may be implemented by a machine learning module including a support vector machine, neural network, random forest, k-means clustering, etc. In certain embodiments, the voice feature extractor 182 may be implemented by a plurality of neural network (NN) layers, convolutional neural network layers, Long-Short-Term-Memory (LSTM) layers, Bi-directional LSTM layers, Recurrent neural network layers, and the like. In certain embodiments, the voice feature extractor 182 may be implemented by a voice processing algorithm, a speech recognition algorithm, a speech processing algorithm, an analog signal processing, a digital signal processing, and the like. The voice feature extractor 182 may analyze the input voice 104 and extract voice features 210 from it. This process is described in greater detail in FIG. 2.

Voice-Based Hash Generator

Voice-based hash generator 184 may be implemented by the processor 172 executing the software instructions 178, and is generally configured to generate a voice-based hash value 154 using voice features 210 extracted from an input voice 104. The voice-based hash generator 184 may be interchangeably referred to herein as a hash generator. In certain embodiments, the hash generator 184 may be implemented by an encryption function 218. The encryption function 218 may include a hash function, a cryptography method, a secure hash algorithm (e.g., SHA-256, SHA-1024, etc.), and the like The voice-based hash generator 184 may use voice feature constant values 186 determined from the voice features 210 in generating the hash value 154. This process is described in greater detail in FIG. 2.

Exception Handler

Exception handler 188 may be implemented by the processor 172 executing the software instructions 178, and is generally configured to receive a response 106 that includes an exception 192, determine a class or type of the exception 192, classify the exception 192 into a respective block 142, determine whether the exception 192 can be resolved and if so, resolve the exception 192.

In certain embodiments, the exception handler 188 may be implemented by a machine learning classification module, a support vector machine, neural network, random forest, k-means clustering, natural language processing, text processing, audio processing, etc. In certain embodiments, the exception handler 188 may be implemented by a plurality of neural network layers, convolutional neural network layers, LSTM layers, Bi-directional LSTM layers, recurrent neural network layers, and the like.

In certain embodiments, the exception handler 188 may be associated with and/or implemented by a set of multitask machine leaning programs 190 (also referred to herein as multitask programs and multitask mini-programs). Each of the multitask programs 190 may be configured to perform the operations of the exception handler 188.

Each multitask program 190 may be trained to perform multiple tasks, such as user detail verification by comparing the provided information in the request 106 with previous records of the user 102, user detail verification by comparing the provided information in the request 106 with records fetched from third party sources, natural language processing tasks, such as determining user information mismatches, e.g., name mismatch, address mismatch, etc.

In certain embodiments, each multitask program 190 may be implemented by quantum computing to have a processing power to perform the multiple tasks described above.

In certain embodiments, each multitask program 190 may be previously trained by various training datasets. For example, each multitask program 190 may be previously trained by a training dataset that comprises various data samples of name mismatches labeled with correct names. In another example, multitask program 190 may be previously trained by a training dataset that comprises various data samples of address mismatches labeled with correct addresses. Each multitask program 190 may use the training datasets to determine the associations between the data sample and its respective label. Each multitask program 190 learns the associations between the data sample and its respective label and uses it to predict the correct label of a sample data in a testing process. Each multitask program 190 may be implemented by a supervised, a semi-supervised, and/or an unsupervised machine learning program.

Figure 2:
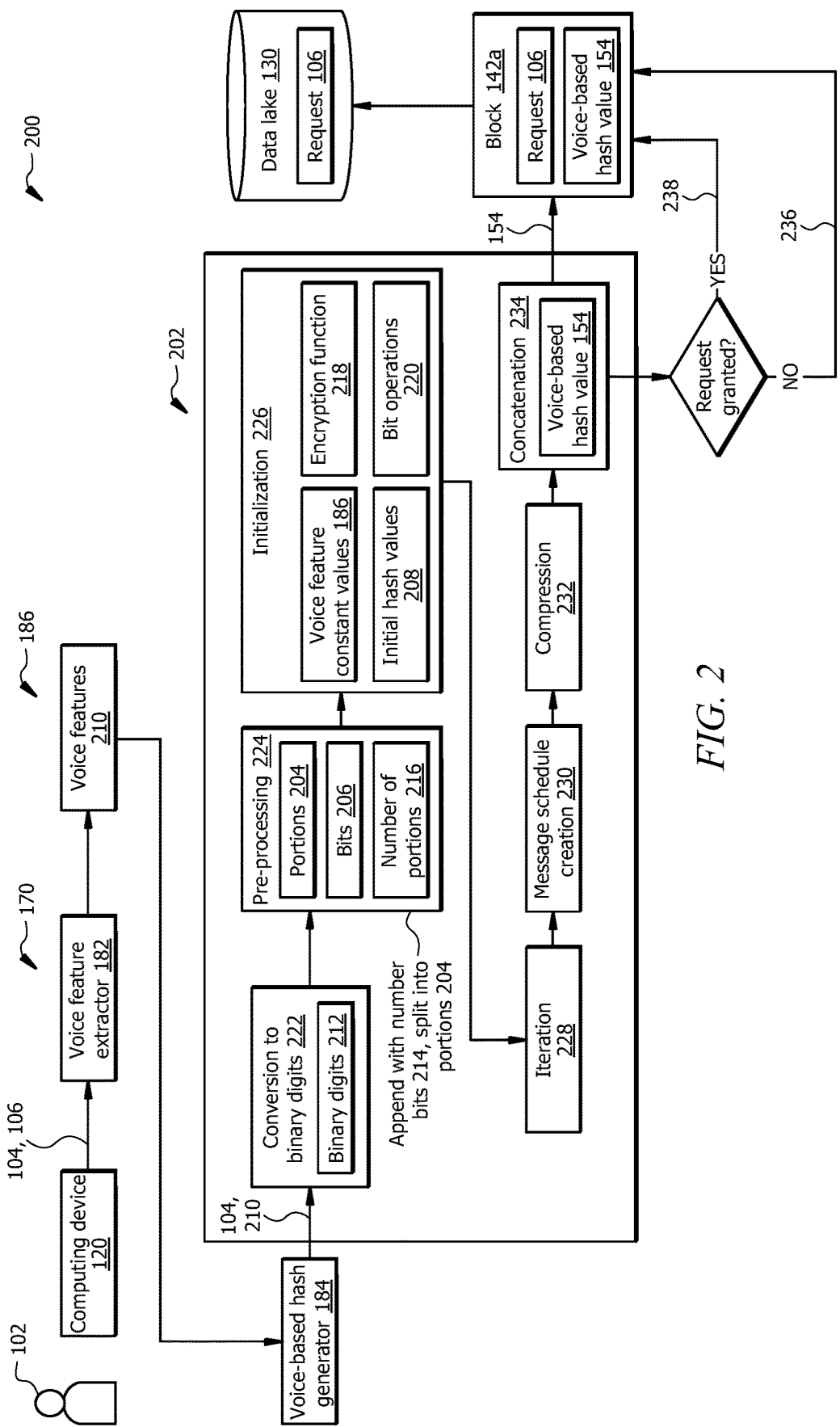
FIG. 2 illustrates an example operational flow of system of FIG. 1 for generating a block in a blockchain network using a voice-based hash value generated by a voice signature of a user.

Example Operational Flow for Generating a Voice-Based Hash Value for a Block in a Blockchain FIG. 2 illustrates an example operational flow 200 of system 100 (see FIG. 1) for generating a voice-based hash value 154 for a block 142 in a blockchain network 140. The operational flow 200 begins when the user 102, from the computing device 120, provides a speech 104 that includes a request 106. For example, the user 102 may provide the speech 104 (e.g., input voice) on a phone, a microphone, and the like. The computing device 120 communicates the speech 104 to the verification device 170 for processing.

The verification device 170 feeds the input voice 104 to the voice feature extractor 182. The voice feature extractor 182 extracts the voice features 210, e.g., by implementing a speech signal processing, similar to that described in FIG. 1.

In certain embodiments, the voice features 210 may include a frequency, a pitch, an amplitude, a zero crossing rate, a root mean square energy, a Mel Spectrogram, a band energy ratio, and a spectral centroid associated with the speech signal 104.

In certain embodiments, the voice features 210 may include a range of parameters of an audio signal that represents the speech signal 104. For example, the voice features 210 may include a range of frequencies associated with the speech signal 104, a range of pitches associated with the speech signal 104, a range of amplitudes associated with the speech signal 104, a range of zero crossing rates associated with the speech signal 104, a range of root mean square energies associated with the speech signal 104, a Mel spectrogram, a range of band energy ratios associated with the speech signal 104, and a range of spectral centroids associated with the speech signal 104.

The frequency may include a range of frequencies of signals detected in the input voice 104. The pitch may include a range of pitches of signals detected in the input voice 104. The amplitude may include a range of amplitudes of signals detected in the input voice 104. The zero crossing rate may include the rate at which each signal detected in the input voice 104 changes from positive to zero to negative or from negative to zero to positive. The root mean square energy may include a measurement of the magnitude of each signal detected in the input voice 104. The Mel spectrogram may include frequencies of signals detected in the input voice 104 converted into a Mel scale and shown in a time domain. The band energy ratio may include measurements of energy of each signal detected in the input voice 104, and their ratio with each other. The spectral centroid may include measurements that indicate where the center of mass of the spectrum of each signal detected in the input voice 104 is located. For example, a first voice feature 210 may comprise a first range of values (e.g., range of frequencies, amplitudes, another voice feature) associated with the speech signal 104, a second voice feature 210 may comprise a second range of values (e.g., range of frequencies, amplitudes, another voice feature) associated with the speech signal 104, a third voice feature 210 may comprise a third range of values (e.g., range of frequencies, amplitudes, another voice feature) associated with the speech signal 104, and so on. The voice features 210 are fed to the voice-based hash generator 184.

Generating a Voice-Based Hash Value

The voice-based hash generator 184 may perform the operations below to generate a voice-based hash value 154. These operations are described in the voice-based hash value generation module 202. The voice-based hash value generation module 202 may include conversion to binary digits 222, pre-processing 224, initialization 226, iteration 228, message schedule creation 230, compression 232, and concatenation 234.

The hash generator 184 converts the input voice 104 to binary digits 212, in the conversion to binary digits 222. In this process, the hash generator 184 may perform analog to digital signal processing, signal quantization, signal sampling, and/or any other signal processing.

The hash generator 184 may perform pre-processing 224. In certain embodiments, the pre-processing 224 may include appending the binary digits 212 and splitting the binary digits 212 into a particular number 216 of portions 204. Appending the binary digits 212 may include appending the binary digits 212 to ensure that they are a multiple of a certain number (e.g., 256, 512, 1024 bits) depending on the type of the encryption function 218 (e.g., SHA-256, SHA-1024, etc.).

The encryption function 218 may be configured to accept the binary digits 212 with a particular length. Thus, appending may be used to ensure that the length of the binary digits 212 is acceptable and compatible with the encryption function 218 used by the hash generator 184.

In parsing, the binary digits 212 appended with a number of bits 214 are parsed into the particular number 216 of portions 204, where each portion 204 has a length of a particular number of bits 206, e.g., 512, 1024 bits, depending on the type of the encryption function 218 (e.g., SHA-256, SHA-1024, etc.).

In the initialization 226, initial hash values 208 may be set. The size of each initial hash value 208 may depend on the size of the initial binary bits 212. The initial hash values 208 may depend on the encryption function 218. The initialization 226 may be performed for each portion 204 of the binary digits 212 determined in the splitting operation described above. In certain embodiments, the initial hash values 208 may be constant and provided by the encryption function 218.

Further in the initialization 226, voice feature constant values 186 are determined. The hash generator 184 may determine the voice feature constant value 186 based on the voice features 210. For example, a first voice feature constant value 186 may be an average value of a first range of values associated with a first voice feature 210, a second voice feature constant value 186 may be an average value of a second range of values associated with a second voice feature 210, a third voice feature constant value 186 may be an average value of a third range of values associated with a third voice feature 210, and so on. For example, if the first voice feature 210 is a frequency of the speech signal 104, the first voice feature constant value 186 may be the average of the range of frequencies of signals in the speech signal 104. In another example, if the second voice feature 210 is an amplitude of the speech signal 104, the second voice feature constant value 186 may be the average of the range of amplitudes of signals in the speech signal 104. In another example, if the third voice feature 210 is a pitch of the speech signal 104, the third voice feature constant value 186 may be the average of the range of pitches of signals in the speech signal 104.

The hash generator 184 may encrypt the plurality of binary digits 212 appended with the number of bits 214 using the encryption function 218. In this process, the hash generator 184 may encrypt each portion 204 of the binary digits 212 using the encryption function 218. The hash generator 184 may use the voice feature constant values 186 in the encryption function 218 used to encrypt the binary digits 212. For example, the encryption function 218 may need certain constant values to perform certain operations on each portion 204 of the binary digits 212, such as shifting by an n-bit where n may be 1, 2, etc., logic gate operations, such as exclusive-OR, etc. mixing right rotation, in bitwise operations. In the same or another example, the encryption function 218 may use a first voice feature constant value 186 as a shift value to shift the digital bits by the first constant value. In the same or another example, the encryption function 218 may use a second voice feature constant value 186 as an additive value in an addition operation to add the second voice feature constant value 186 to the binary bits in one or more portions 204 of the binary digits 212. In the same or another example, the encryption function 218 may use a third voice feature constant value 186 as a deduction value in a deduction operation to deduct the third voice feature constant value 186 from the binary bits in one or more portion 204 of the binary digits 212. In the same or another example, the encryption function 218 may use any of the voice feature constant values 186 as any constant value in any operation, such as addition, reduction, multiplication, division that may be performed in the encryption function 218 used by the hash generator 184. The hash generator 184 may generate an initial hash value 208 for each portion 204 of the binary digits 212 using the operations described in pre-processing 224 and initialization 226.

In iteration 228, the operations described above including the initialization 226 may iteratively be performed for each portion 204 of the binary digits 212. The output of the operations performed on each portion 204 of the binary digits 212 may become the input to the next portion 204 of the binary digits 212. In iteration 228, the hash generator 184 may separate the voice features 210 into the portions, and indicate a sequence of the voice features 210.

In message schedule creation 230, the hash generator 184 may implement a message schedule function that includes exclusive-OR, bit shifts, and bit rotations on each portion of the binary digits 212. In this operation, each portion of the binary digits 212 is expanded into a larger size portion using the message schedule function. For example, if each portion that is 512 bits may be expected into a 2048 bit. Further, in the message schedule creation 230, the hash generator 184 encodes its input in form of a message. For example, if a first message is given to the hash generator 184, it produces a first hash value, and if a second message is given to the hash generator 184, it produces a second hash value.

In compression 232, the hash generator 184 compresses the plurality of initial hash values 208 determined for the plurality of portions 204 of the binary digits 212. The hash generator 184 may compress the plurality of initial hash values 208, such that the compressed hash value is a particular size, e.g., 256 bits, etc.

In concatenation 234, the hash generator 184 concatenates the plurality of initial hash values 208, and link them in a particular sequence. In certain embodiments, the concatenated initial hash values 208 corresponds to the voice-based hash value 154.

The blockchain network 140 and/or the verification device 170 creates a block 142*a* using the voice-based hash value 154. In other words, the blockchain network 140 and/or the verification device 170 may add the request 106 as a block 142*a* to the blockchain network 140. The voice-based hash value 154 may be used to uniquely identify the block 142*a*. The request 106 is stored in the data lake 130 for record-keeping.

The verification device 170 determines whether the request 106 is granted. If the verification device 170 determines that the request 106 is granted, the verification device 170 communicates the request 106 to other blocks 142 of the blockchain network 140 stores a message 238 that indicates the request 106 is granted in the block 142*a*. Otherwise, the verification device 170 stores a message 236 that indicates the request 106 is denied in the block 142*a*. The verification device 170 may determine whether the request 106 is granted, if it is determined that the request 106 does not have any exception 192 or if it has an exception, the exception 192 is resolved. This process is described in greater detail in FIG. 3.

Example Operational Flow for Identifying and Resolving Exceptions in Requests

Figure 3:
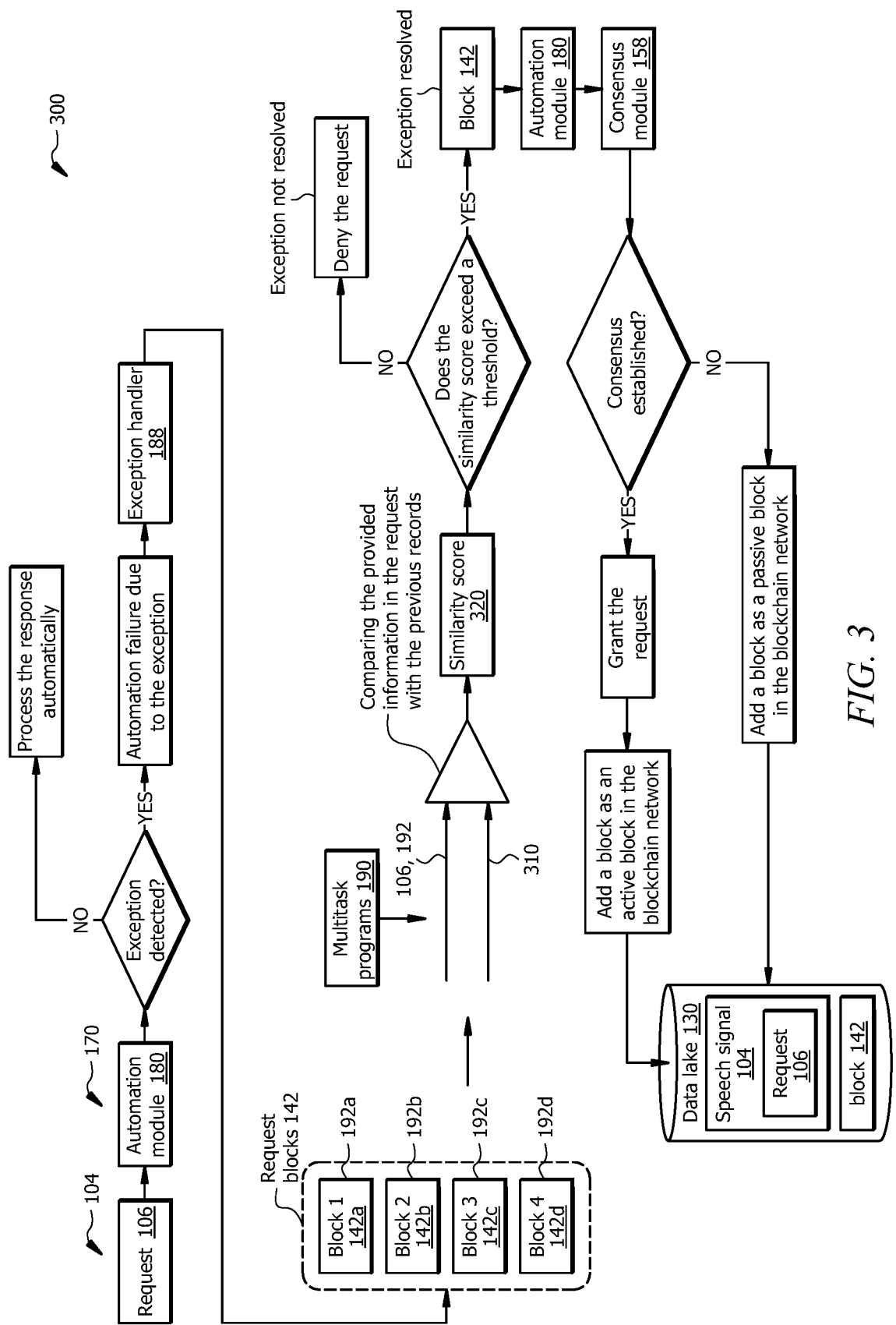
FIG. 3 illustrates an example operational flow of the system of FIG. 1 for identifying and resolving exception request blocks in a blockchain network.

FIG. 3 illustrates an example operational flow 300 of system 100 (see FIG. 1) for identifying and resolving exceptions 192 in responses 106. The operational flow 300 begins when the request 106 is received at the verification device 170, similar to that described in FIGS. 1 and 2.

The verification device 170 feeds the request 106 to the automation module 180. The automation module 180 determines whether an exception 192 is detected in the request 106. Examples of the exceptions 192 are described in FIG. 1. The exception 192 may include any anomaly that prevents the automation module 180 to process the request 106 automatically. In this process, the automation module 180 may implement an audio processing algorithm to break down the input audio into individual sounds, analyze each sound, and find the most probable word that fits the language used in each sound. In certain embodiments, the automation module 180 may further transcribe the input audio 104 into text. In this manner, the automation module 180 may determine the information provided in the request 106. The information provided in the request 106 may include a name, an address, an identifier, such as a social security number, the type of account that the user 102 wants to open, and any other information. The type of account may include normal account (e.g., a personal account) and a cryptocurrency account (e.g., an account used to put cryptocurrency, an account used to invest in cryptocurrency). From the information provided in the request 106, the automation module 180 may determine whether there is an exception 192, such as incomplete, incorrect information, or an irregular request.

For example, the user 102 has not provided a middle name, a salutation (e.g., II), used # in the address, used abbreviated words, e.g., APT instead of an apartment, requested to only include the first name on an account (or an identifier, e.g., a card) without a last name, and/or any other exceptions 192 (e.g., anomalies) that the automation module 180 is not configured to process automatically.

If the automation module 180 determines that the request 106 includes an exception 192, it is determined an automation failure (e.g., the automation module 180 is failed) due to the exception 192. Otherwise, the automation module 180 may process the request 106 automatically. If the automation module 180 determines that the request 106 includes an exception 192, the verification device 170 feeds the request 106 to the exception handler 188.

The exception handler 188 determines to which class the exception 192 belongs. The exception handler 188 may implement the multitask programs 190 to determine to which class the exception 192 belongs. In this process, the exception handler 188 (e.g., via the multitask programs 190) may implement text processing, natural language processing, and the like to determine the meaning of the text which is the transcription of the input audio 104. The classes of the exceptions 192 may include verification exception 192*a*, user profile update exception 192*b*, booking exception 192*c*, and feature exception 192*d*.

In the class of verification exception 192*a*, name mismatches, address mismatches, data of birth mismatches, identifier (e.g., social security number) mismatches may be included. The verification exception 192*a* may occur when the identity of the user 102 cannot be verified by the information provided in the request 106.

The user profile update exception 192*b* may occur when the user profile is not updated compared to the previous user records 310 associated with the user 102. For example, the user 102 may provide an updated address in the request 106 that does not match with the address previously recorded in the previous user records 310. For example, major address changes, employment changes, contact details changes, and citizenship changes may be in the class of the user profile update exception 192*b*. The address mismatches in the verification exception 192 may be minor mismatches, e.g., when the user 102 uses APT instead of an apartment. The address mismatches in the user profile update exception 192*b* may be major mismatches, e.g., the user 102 has provided a new address in the request 106.

The booking exception 192*c* may occur when the user 102 provides an incomplete account number (e.g., last four digits) in the input audio 104 and/or the user 102 requested a new document (e.g., a card) and requested to only include the first name on the new document. Such anomalies and requests are not processed automatically by the automation module 180.

The feature exception 192*d* may occur when the user 102 requests for paperless statements in the speech 104, requests to link their account to another account but only provided last four digits of the other account (e.g., associated with the same or another user 102), requests to link their account to another account (associated with the same user 102), requests to link their account to another account (associated with a different user 102), requests to add an online capability to use their account. Such anomalies and requests are not processed automatically by the automation module 180. The exception handler 188 may determine to which type or class the exception 192 belongs.

In response, the exception handler 188 (e.g., via the verification device 170 and/or the blockchain network 140) generates a block 142 to store and classify the exception 192. The exception handler 188 may store various exceptions 192 into their appropriate block 142 based on their classification. For example, the exception handler 188 may store the verification exceptions 192*a* detected in various requests 106 in the block 142*a*, user profile update exceptions 192*b* detected in various requests 106 in the block 142*b*, booking exceptions 192*c* detected in various requests 106 in the block 142*c*, and feature exceptions 192*d* detected in various requests 106 in the block 142*d*.

Determining Whether the Exception can be Resolved

The exception handler 188 may implement the multitask programs 190 to determine whether the exception 192 can be resolved. In this operation, exception handler 188 may compare the information provided in the request 106 with the previous user records 310 associated with the user 102. The previous user records 310 may include information that the user 102 previously provided to the organization 108.

In certain embodiments, where the user 102 is a new client and has not provided information to the organization 108 previously, the exception handler 188 may fetch records of the user 102 from third party sources (e.g., government sources) and compare the information provided in the request 106 with records of the user 102 fetched from the third party sources.

The exception handler 188 may determine a similarity score 320 that represents a similarity between the information provided in the request 106 and the previous user records 310 (or user records fetched from the third party sources).

The exception handler 188 may compare the similarity score 320 with a threshold percentage 330, e.g., 99%. If the exception handler 188 determines that the similarity score 320 exceeds the threshold percentage 330, the exception handler 188 determines that the exception 192 can be resolved and resolve the exception 192. The exception handler 188 may resolve the exception 192 by replacing or filling out the exception 192 with the correct and previously verified information (e.g., previously verified user information from the previous user records 310 and/or from user records fetched from third party sources). Otherwise, the exception handler 188 determines that the exception 192 cannot be resolved. In this case, the verification device 170 denies the request 106.

In certain embodiments, in case additional information is required to resolve the exception 192, the exception handler 188 may search through the blockchain network 140 and/or the blockchain ledger 160 to determine the additional information. If the additional information is not found in the blockchain network 140 and/or the blockchain ledger 160, the additional information may be requested from the user 102, e.g., by an employee or the verification device 170.

If the exception handler 188 determines that the exception is resolved, the exception handler 188 (e.g., via the blockchain network 140 and/or the verification device 170) may generate a new block 142 in the blockchain network 140. The new block 142 may store records of the request 106, input audio 104, transcription of the input audio 104, exception 192, and the classification of the exception 192. The new block 142 may be stored in the data lake 130.

The exception handler 188 may feed the request 106, the input audio 104, and the resolved exception 192 to the automation module 180. The automation module 180 processes the received data. The automation module 180 determines the validity of the identity of the user 102 by comparing the provided information in the request 106 with the previous user records 310. In this process, the automation module 180 determines whether the user 102 is the same person associated with the previous user records 310. If the automation module 180 validates the identity of the user 102, the automation module 180 feeds the received data to the consensus module 158. Otherwise, the automation module 180 may deny the request 106.

The automation module 180 may communicate the identity of the user 102 to other blocks 142. The consensus module 158 determines whether consensus is established among the blocks 142 about the latest status of the blocks 142, the blockchain ledger 160, and the identity of the user 102, similar to that described in FIG. 1.

The consensus module 158 may determine that the consensus is established among the blocks 142 about the latest status of the blocks 142, the blockchain ledger 160, and the identity of the user 102, if the identity of the user 102 is verified. Otherwise, the consensus module 158 may determine that the consensus cannot be established among the blocks 142.

If it is determined that the consensus is established among the blocks 142 about the latest status of the blocks 142, the blockchain ledger 160, and the identity of the user 102, the automation module 180 grants the request 106. For example, if the request 106 is to open a new account, the automation module 180 opens a new account for the user 102. In response, a new block 142 as an active block 142 is added to the distributed ledger in the blockchain network 140. The active block 142 indicates that the request 106 is granted. The active block 142 may be stored in the data lake 130.

If it is determined that the consensus cannot be established among the blocks 142 about the latest status of the blocks 142, the blockchain ledger 160, and the identity of the user 102, a new block 142 is added as a passive block in the blockchain network 140. The passive block may indicate that the consensus is not established regarding the identity of the user 102 among the blocks 142.

Figure 4:
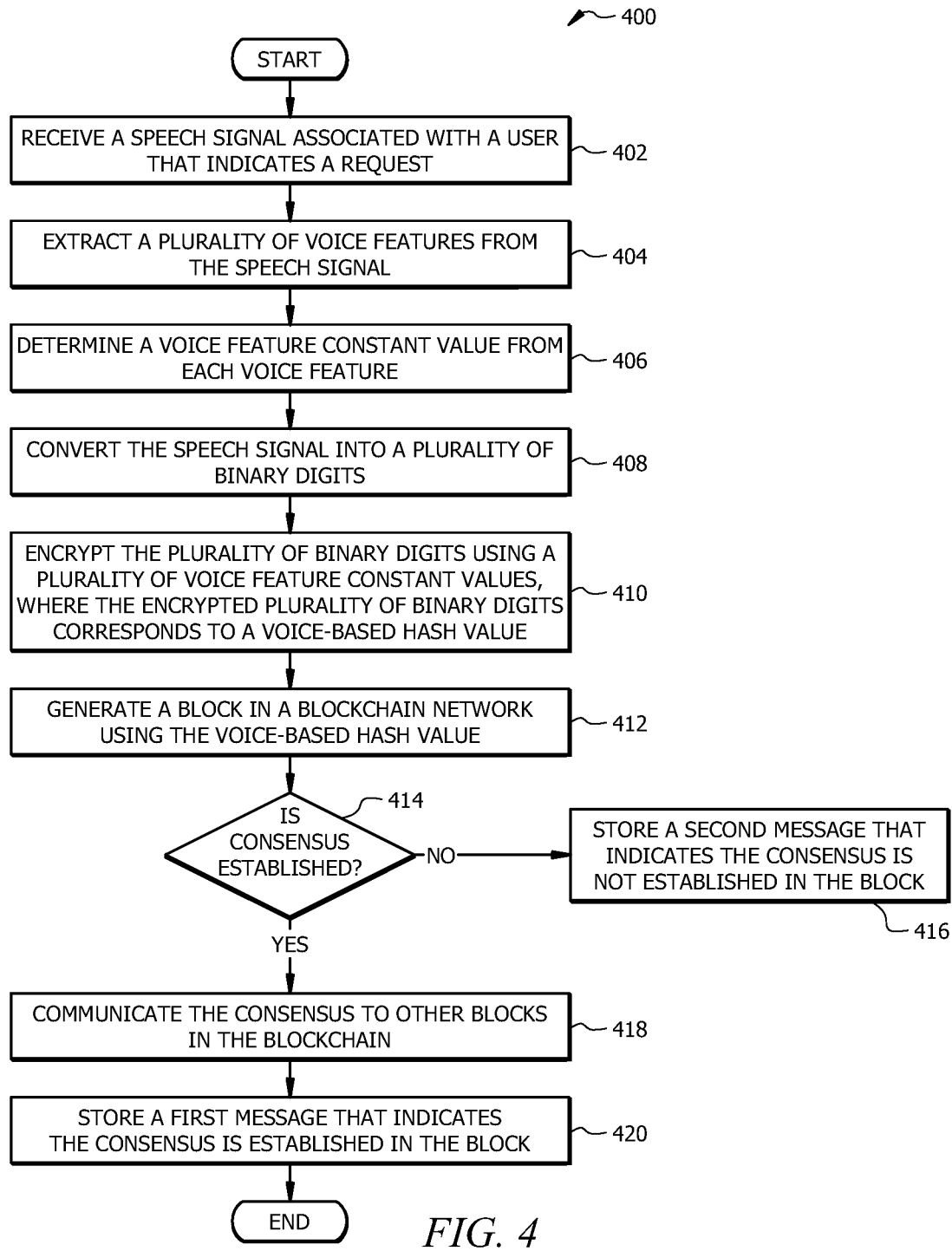
FIG. 4 illustrates an example flowchart of a method for generating a block in a blockchain network using a voice-based hash value generated by a voice signature of a user.

Example Method for Generating a Voice-Based Hash Value for a Block in a Blockchain FIG. 4 illustrates an example flowchart of a method 400 for generating a voice-based hash value 154 for a block 142 in a blockchain network 140. Modifications, additions, or omissions may be made to method 400. Method 400 may include more, fewer, or other operations. For example, operations may be performed in parallel or in any suitable order. While at times discussed as the system 100, blockchain network 140, verification device 170, or components of any of thereof performing operations, any suitable system or components of the system may perform one or more operations of the method 400. For example, one or more operations of method 400 may be implemented, at least in part, in the form of software instructions 150, 178 of FIG. 1, stored on non-transitory, tangible, machine-readable media (e.g., memories 148, 176 of FIG. 1) that when run by one or more processors (e.g., processors 144, 172 of FIG. 1) may cause the one or more processors to perform operations 402-420.

At 402, the verification device 170 receives a speech signal 104 associated with a user 102 that indicates a request 106. For example, the verification device 170 may receive the speech signal 104 via network 110 from the computing device 120, similar to that described in FIGS. 1 and 2.

At 404, the verification device 170 (e.g., via the voice feature extractor 182) extracts a plurality of voice features 210, similar to that described in FIG. 2. Examples of the plurality of voice features 210 are described in FIG. 2.

At 406, the verification device 170 (e.g., via the voice feature extractor 182) determines a voice feature constant value 186 from each voice feature 210. In other words, the verification device 170 (e.g., via the voice feature extractor 182) determines a plurality of voice feature constant values 186 from the plurality of voice features 210. Each voice feature constant value 186 may be an average, a median, a maximum, or a minimum value of a range of values associated with a respective voice feature 210.

At 408, the verification device 170 (e.g., via the hash generator 184) converts the speech signal 104 into a plurality of binary digits 212. In this process, the verification device 170 (e.g., via the hash generator 184) may perform analog to digital signal processing, signal quantization, signal sampling, and/or any other signal processing.

At 410, the verification device 170 (e.g., via the hash generator 184) encrypts the plurality of binary digits 212 using the plurality of voice feature constant values 186, where the encrypted plurality of binary digits 212 corresponds to a voice-based hash value 154. In this process, the verification device 170 (e.g., via the hash generator 184) may perform the operation below.

The hash generator 184 may append the plurality of binary digits 212 with a particular number 214 of bits such that the plurality of binary digits 212 appended with the particular number 214 of bits has a length that is a multiplier of an input to an encryption function 218 used in encrypting the plurality of binary digits 212. The particular number 214 of bits may start with "1" and the rest of the bits may be "0".

The hash generator 184 may split the plurality of binary digits 212 appended with the particular number 214 of bits into a particular number 216 of portions 204, such that the input to the encryption function 218 used in encrypting the plurality of binary digits 212 has a first length that is divisible by a second length of each portion 204 of the particular number 216 of portions 204.

The hash generator 184 may perform the following operations for each portion 204 of the particular number of portions 216.

The hash generator 184 may encrypt each portion 204 of the binary digits 212 using the encryption function 218. In this process, the hash generator 184 may perform one or more bit operations 220 on one or more bits within each portion 204. For example, the hash generator 184 may perform a bit-shift operation 220 (e.g., a rotate right bit-shift, rotate left bit shift operation) on at least one bit within the portion 204. In another example, the hash generator 184 may perform a bit-shift operation 220 (e.g., a rotate right bit-shift, rotate left bit shift operation) on the bits within the portion 204. For example, the number of bits to shift may be one of the voice feature constant values 186. In another example, one of the voice feature constant values 186 may be used as a shift value in the bit-shift operation 220. In another example, the hash generator 184 may perform a logic gate operation (e.g., an exclusive-OR) among at least two bits within the portion 204, e.g., every two adjacent bits, a bit with a voice feature constant value 186. In another example, one of the voice feature constant values 186 may be used in the exclusive-OR operation. In certain embodiments, each of the voice feature constant values 186 may be used in a different bit operation 220, such as an addition, a deduction, logic gate operations, bit-shift operations, etc. value with the bits within the portion 204.

The hash generator 184 may generate an initial hash value 208 for each portion 204. The initial hash value 208 may correspond to the output of a combination of the bit operations 220 performed on bits of each portion 204. The hash generator 184 may compress each initial hash value 208. The hash generator 184 may concatenate the initial hash values 208. The concatenated initial hash values 208 may correspond to the voice-based hash value 154.

At 412, the verification device 170 (e.g., via the hash generator 184 and/or the blockchain network 140) generates a block 142 (e.g., block 142a) in the blockchain network 140 using the voice-based hash value 154.

At 414, the verification device 170 determines whether the consensus established. In this process, the verification device 170 determines whether the consensus or agreement to grant the request 106 is established between the blocks 142 in the blockchain network 140. If the verification device 170 determines that the consensus is established, method 400 proceeds to 418. Otherwise, method 400 proceeds to 416.

At 416, the verification device 170 stores a message 236 that indicates the consensus is established in the block 142a. In certain embodiments, if the consensus to grant the request 106 is not established, the verification device 170 may store the message 236 that indicates the request 106 is denied in the block 142a.

At 418, the verification device 170 communicates the consensus to other blocks 142 of the blockchain network 140. In certain embodiments, if the consensus to grant the request 106 is established, the verification device 170 may communicate the request 106 to other blocks 142 of the blockchain network 140.

At 420, the verification device 170 stores a message 238 that indicates the consensus is established in the block 142a. In certain embodiments, the verification device 170 may store the message 238 that indicates the request 106 is granted in the block 142a.

Example Method for Resolving Exceptions in Requests

Figure 5:
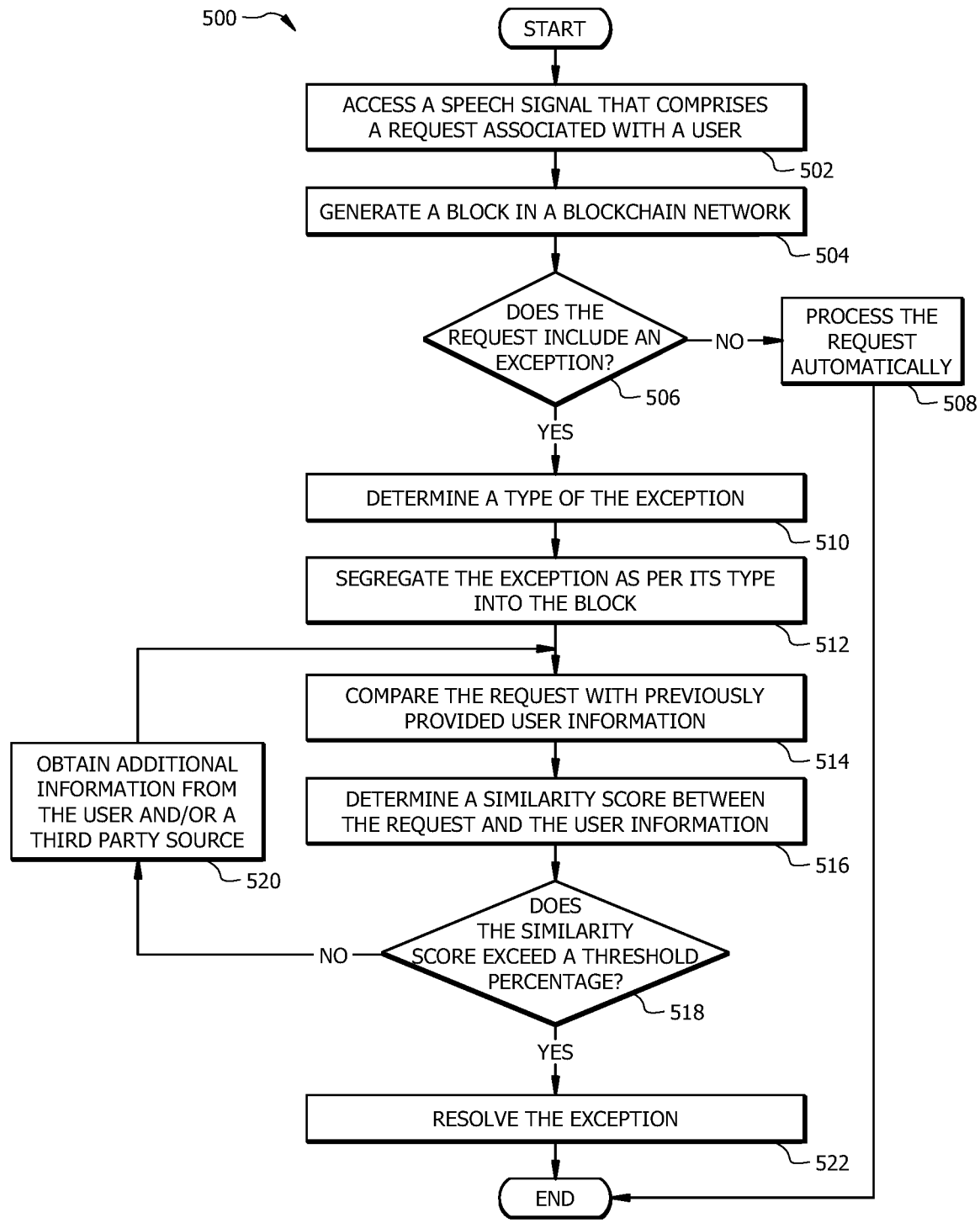
FIG. 5 illustrates an example flowchart of a method for resolving exceptions in requests.

FIG. 5 illustrates an example flowchart of a method 500 for resolving exceptions 192 in requests 106. Modifications, additions, or omissions may be made to method 500. Method 500 may include more, fewer, or other operations. For example, operations may be performed in parallel or in any suitable order. While at times discussed as the system 100, blockchain network 140, verification device 170, or components of any of thereof performing operations, any suitable system or components of the system may perform one or more operations of the method 500. For example, one or more operations of method 500 may be implemented, at least in part, in the form of software instructions 150, 178 of FIG. 1, stored on non-transitory, tangible, machine-readable media (e.g., memories 148, 176 of FIG. 1) that when run by one or more processors (e.g., processors 144, 172 of FIG. 1) may cause the one or more processors to perform operations 502-522.

At 502, the verification device 170 accesses a speech signal 104 that comprises a request 106 associated with a user 102. For example, the verification device 170 may access the speech signal 104 stored in the data lake 130, similar to that described in FIG. 3. The request 106 may comprise opening a user account to be able to use a service and/or product provided by the organization 108.

At 504, the verification device 170 generates a block 142 in the blockchain network 140. The block 142 is configured to store exceptions 192 with a same type.

At 506, the verification device 170 determines whether the request 106 includes an exception 192. For example, the verification device 170 feeds the request 106 to the automation module 180, similar to that described in FIG. 3. The exception 192 may interchangeably be referred to herein as an anomaly 192. The anomaly 192 may impede (automatic) processing the request 106 such that the request 106 to be granted or denied. The anomaly 192 may impede (or prevent) the processing of the request 106 by the automation module 180. Thus, the automation module 180 cannot grant or deny the request 106. If the verification device 170 determines that the request 106 includes an anomaly 192, method 500 proceeds to 508. Otherwise, method 500 proceeds to 506.

At 508, the verification device 170 processes the request 106 automatically, similar to that described in FIG. 3.

At 510, the verification device 170 determines a type (e.g., class) of the exception 192. The type of the exception 192 may indicate whether the exception 192 is incomplete information, incorrect information, or previously-unknown information (e.g., an irregular request and/or information) comprised in the request 106, similar to that described in FIG. 3. The verification device 170, e.g., via the exception handler 188, extracts contextual data from the request 106 and the exception 192, similar to that described in FIG. 3.

Based on the extracted contextual data and details in the block 142, the type of exception 192 is identified. Accordingly, the block 142 is segregated for exception processing based on its exception type.

At 512, the verification device 170 segregates the exception 192 as per its type into the block 142. In certain embodiments, the verification device 170 may store the exception 192 in the block 142. For example, the exception 192 may be any of the exceptions 192a to 192d described in FIG. 3. The block 142 may be any of the blocks 142a to 142d described in FIG. 3. The multitask pre-trained machine learning programs 190 may resolve the exception 192 as per its type, similar to that described in FIG. 3.

At 514, the verification device 170 compares the request 106 with previously provided user information. The user information may be (or included in) the previous user records 310 and/or third party sources, similar to that described in FIG. 3. The previous user records 310 may include a name, an address, contact information, date-of-birth, and/or any other information associated with the user 102. In this process, the verification device 170 may implement text processing, natural language processing on the request 106. In response, the verification device 170 extracts features from the request 106. The features may be represented in a vector of numerical values. The verification device 170 may perform a similar operation the user information. The verification device 170 may compare the first set of features extracted from the request 106 with a second set of features extracted from the user information. In this process, in certain embodiments, the verification device 170 may perform vector comparison, and determine a Euclidian distance between a first vector representing the first set of features and a second vector representing the second set of features. If the Euclidian distance may be inversely proportional to the similarity score 320. For example, if the Euclidian distance is 1%, the similarity score 320 may be 99%.

In certain embodiments, determining the similarity score 320 may include the following operations. The verification device 170 may extract a first set of features from the request 106, where the first set of features is represented by a first vector of numerical values. The verification device 170 may extract a second set of features from the user information (e.g., previous user records 310), where the second set of features is represented by a second vector of numerical values. The verification device 170 may compare the first vector with the second vector. the verification device 170 may determine a percentage of numerical values in the first vector that correspond to counterpart numerical values in the second vector, where the percentage of numerical values in the first vector that correspond to counterpart numerical values in the second vector may be the similarity score 320.

At 516, the verification device 170 determines a similarity score 320 between the request 106 and the user information (e.g., the previous user records 310). The similarity score 320 indicates a percentage of similarity between the request 106 and the user information (e.g., the previous user records 310).

At 518, the verification device 170 determines whether the similarity score 320 exceeds a threshold percentage 330. If the verification device 170 determines that the similarity score 320 exceeds the threshold percentage 330, method 500 proceeds to 524. Otherwise, method 500 proceeds to 520.

At 520, the verification device 170 obtains additional information from the user 102 and/or third party sources, similar to that described in FIG. 3. The verification device 170 may add the additional information to the user information. The method 500 may return to 514 to compare the request 106 with the user information now added with the additional information. In certain embodiments, an employee of the organization 108 may contact the user 102 to obtain the additional information and/or confirm the information provided in the request 106. The verification device 170 may obtain the additional information from the employee.

At 522, the verification device 170 resolves the exception 192. The verification device 170 may determine that the exception 192 can be resolved, and in response, resolve the exception 192.

In certain embodiments, in response to determining that the type of the exception 192 indicates that the exception 192 is incorrect information, resolving the exception 192 may include the following operations. The verification device 170 may fetch previously verified information from the user information (e.g., the previous user records 310). The verification device 170 may replace the incorrect information with the previously verified information.

In certain embodiments, in response to determining that the type of the exception 192 indicates that the exception 192 is incomplete information, resolving the exception 192 may include the following operation. The verification device 170 may fetch previously verified information from the user information. The verification device 170 may fill out the incomplete information with the previously verified information.

In certain embodiments, in response to determining that the type of the exception 192 indicates that the exception 192 is previously-unknown information (e.g., irregular request and/or information), resolving the exception 192 may include the following operations. The verification device 170 may communicate the previously-unknown information to an operator (e.g., an employee of the organization 108). The operator may contact the user 102 to confirm the previously-unknown information. If the user 102 confirms the previously-unknown information, the verification device 170 may receive a message that indicates the previously-unknown information is verified from the operator. The verification device 170 may update the user information with the previously-unknown information.

In certain embodiments, method 500 may include additional operations described in FIG. 3, such as granting the request 106 and/or any other operations.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for generating a block in a blockchain network using a voice-based hash value, the system comprising:
 a memory configured to store a speech signal associated with a user that indicates a request;
 a network interface configured to receive the speech signal; and
 a processor operably coupled with the memory and the network interface, and configured to:
  access the speech signal;
  extract a plurality of voice features from the speech signal, wherein:
   the plurality of voice features represents a unique voice signature associated with the user;
   the plurality of voice features comprises a first voice feature and a second voice feature;
   the first voice feature comprises a first range of values associated with the speech signal; and
   the second voice feature comprises a second range of values associated with the speech signal;
  convert the speech signal into a plurality of binary digits;
  determine a first voice feature constant value associated with the first voice feature, wherein the first voice feature constant value comprises an average of the first range of values;
  determine a second voice feature constant value associated with the second voice feature, wherein the second voice feature constant value comprises an average of the second range of values;
  encrypt the plurality of binary digits using at least the first voice feature constant value and the second voice feature constant value, wherein the encrypted plurality of binary digits corresponds to a voice-based hash value, wherein encrypting the plurality of binary digits comprises:
   appending the plurality of binary digits with a particular number of bits such that the plurality of binary digits appended with the particular number of bits has a length that is a multiplier of an input to an encryption function used in encrypting the plurality of binary digits;
   splitting the plurality of binary digits appended with the particular number of bits into a particular number of portions, wherein the input to the encryption function has a first length that is divisible by a second length of each portion from among the particular number of portions;
   for each portion from among the particular number of portions:
    performing a bit-shift operation on at least one bit within the portion;
    performing an exclusive-OR operation among at least two bits within the portion; and
    generating an initial hash value that corresponds to an output of a combination of the bit-shift operation and the exclusive-OR operation;
   compressing a plurality of initial hash values; and
   concatenating the plurality of initial hash values, wherein the concatenated plurality of initial hash values corresponds to the voice-based hash value; and
  generate a new block in a blockchain network using the voice-based hash value, wherein the voice-based hash value uniquely identifies the new block.

2. The system of claim 1, wherein:
 the first voice feature constant value is used as a shift value in the bit-shift operation; and
 the second voice feature constant value is used in the exclusive-OR operation.

3. The system of claim 1, wherein the plurality of voice features comprises at least one of:
 a range of frequencies associated with the speech signal;
 a range of pitches associated with the speech signal;
 a range of amplitudes associated with the speech signal;
 a range of zero crossing rates associated with the speech signal;
 a range of root mean square energies associated with the speech signal;
 a Mel spectrogram;
 a range of band energy ratios associated with the speech signal; and
 a range of spectral centroids associated with the speech signal.

4. The system of claim 1, wherein the processor is further configured to:
 determine a third voice feature constant value associated with a third voice feature from among the plurality of voice features, wherein:
  the third voice feature comprises a third range of values associated with the speech signal;
  the third voice feature constant value comprises an average of the third range of values; and
 encrypt the plurality of binary digits using at least the first voice feature constant value, the second voice feature constant value, and the third voice feature constant value.

5. The system of claim 1, wherein the processor is further configured to:
 determine whether the request is granted;
 in response to determining that the request is granted:
 communicate the request with other blocks in the blockchain network; and
 store a first message that indicates the request is granted in the new block.

6. The system of claim 5, wherein the processor is further configured to, in response to determining that the request is denied, store a second message that indicates the request is denied in the new block.

7. A method for generating a block in a blockchain network using a voice-based hash value, the method comprising:
 receiving a speech signal associated with a user that indicates a request;
 extracting a plurality of voice features from the speech signal, wherein:
  the plurality of voice features represents a unique voice signature associated with the user;
  the plurality of voice features comprises a first voice feature and a second voice feature;
  the first voice feature comprises a first range of values associated with the speech signal; and
  the second voice feature comprises a second range of values associated with the speech signal;

converting the speech signal into a plurality of binary digits;
determining a first voice feature constant value associated with the first voice feature, wherein the first voice feature constant value comprises an average of the first range of values;
determining a second voice feature constant value associated with the second voice feature, wherein the second voice feature constant value comprises an average of the second range of values;
encrypting the plurality of binary digits using at least the first voice feature constant value and the second voice feature constant value, wherein the encrypted plurality of binary digits corresponds to a voice-based hash value, wherein encrypting the plurality of binary digits comprises:
  appending the plurality of binary digits with a particular number of bits such that the plurality of binary digits appended with the particular number of bits has a length that is a multiplier of an input to an encryption function used in encrypting the plurality of binary digits;
  splitting the plurality of binary digits appended with the particular number of bits into a particular number of portions, wherein the input to the encryption function has a first length that is divisible by a second length of each portion from among the particular number of portions;
  for each portion from among the particular number of portions:
    performing a bit-shift operation on at least one bit within the portion;
    performing an exclusive-OR operation among at least two bits within the portion; and
    generating an initial hash value that corresponds to an output of a combination of the bit-shift operation and the exclusive-OR operation;
  compressing a plurality of initial hash values; and
  concatenating the plurality of initial hash values, wherein the concatenated plurality of initial hash values corresponds to the voice-based hash value; and
generating a new block in a blockchain network using the voice-based hash value, wherein the voice-based hash value uniquely identifies the new block.

8. The method of claim 7, wherein:
the first voice feature constant value is used as a shift value in the bit-shift operation; and
the second voice feature constant value is used in the exclusive-OR operation.

9. The method of claim 7, wherein the plurality of voice features comprises at least one of:
a range of frequencies associated with the speech signal;
a range of pitches associated with the speech signal;
a range of amplitudes associated with the speech signal;
a range of zero crossing rates associated with the speech signal;
a range of root mean square energies associated with the speech signal;
a Mel spectrogram;
a range of band energy ratios associated with the speech signal; and
a range of spectral centroids associated with the speech signal.

10. The method of claim 7, further comprising:
determining a third voice feature constant value associated with a third voice feature from among the plurality of voice features, wherein:
  the third voice feature comprises a third range of values associated with the speech signal;
  the third voice feature constant value comprises an average of the third range of values; and
encrypting the plurality of binary digits using at least the first voice feature constant value, the second voice feature constant value, and the third voice feature constant value.

11. The method of claim 7, further comprising:
determining whether the request is granted;
in response to determining that the request is granted:
  communicating the request with other blocks in the blockchain network; and
  storing a first message that indicates the request is granted in the new block.

12. The method of claim 11, further comprising, in response to determining that the request is denied, store a second message that indicates the request is denied in the new block.

13. A non-transitory computer-readable medium storing instructions that when executed by a processor, causes the processor to:
receive a speech signal associated with a user that indicates a request;
extract a plurality of voice features from the speech signal, wherein:
  the plurality of voice features represents a unique voice signature associated with the user;
  the plurality of voice features comprises a first voice feature and a second voice feature;
  the first voice feature comprises a first range of values associated with the speech signal; and
  the second voice feature comprises a second range of values associated with the speech signal;
convert the speech signal into a plurality of binary digits;
determine a first voice feature constant value associated with the first voice feature, wherein the first voice feature constant value comprises an average of the first range of values;
determine a second voice feature constant value associated with the second voice feature, wherein the second voice feature constant value comprises an average of the second range of values;
encrypt the plurality of binary digits using at least the first voice feature constant value and the second voice feature constant value, wherein the encrypted plurality of binary digits corresponds to a voice-based hash value, wherein encrypting the plurality of binary digits comprises:
  appending the plurality of binary digits with a particular number of bits such that the plurality of binary digits appended with the particular number of bits has a length that is a multiplier of an input to an encryption function used in encrypting the plurality of binary digits;
  splitting the plurality of binary digits appended with the particular number of bits into a particular number of portions, wherein the input to the encryption function has a first length that is divisible by a second length of each portion from among the particular number of portions;

for each portion from among the particular number of portions:
    performing a bit-shift operation on at least one bit within the portion;
    performing an exclusive-OR operation among at least two bits within the portion; and
    generating an initial hash value that corresponds to an output of a combination of the bit-shift operation and the exclusive-OR operation;
compressing a plurality of initial hash values; and
concatenating the plurality of initial hash values, wherein the concatenated plurality of initial hash values corresponds to the voice-based hash value; and
generate a new block in a blockchain network using the voice-based hash value, wherein the voice-based hash value uniquely identifies the new block.

14. The non-transitory computer-readable medium of claim 13, wherein:
    the first voice feature constant value is used as a shift value in the bit-shift operation; and
    the second voice feature constant value is used in the exclusive-OR operation.

15. The non-transitory computer-readable medium of claim 13, wherein the plurality of voice features comprises at least one of:
    a range of frequencies associated with the speech signal;
    a range of pitches associated with the speech signal;
    a range of amplitudes associated with the speech signal;
    a range of zero crossing rates associated with the speech signal;
    a range of root mean square energies associated with the speech signal;
    a Mel spectrogram;
    a range of band energy ratios associated with the speech signal; and
    a range of spectral centroids associated with the speech signal.

16. The non-transitory computer-readable medium of claim 13, wherein the instructions further cause the processor to:
    determine a third voice feature constant value associated with a third voice feature from among the plurality of voice features, wherein:
        the third voice feature comprises a third range of values associated with the speech signal;
        the third voice feature constant value comprises an average of the third range of values; and
    encrypt the plurality of binary digits using at least the first voice feature constant value, the second voice feature constant value, and the third voice feature constant value.

17. The non-transitory computer-readable medium of claim 13, wherein the voice-based hash value comprises an alpha-numerical string.

* * * * *